(12) United States Patent
De Wergifosse et al.

(10) Patent No.: US 11,220,959 B2
(45) Date of Patent: Jan. 11, 2022

(54) DEVICE FOR DRIVING A FUEL PUMP FOR A TURBOMACHINE

(71) Applicants: SAFRAN AIRCRAFT ENGINES, Paris (FR); SAFRAN ELECTRICAL & POWER, Blagnac (FR)

(72) Inventors: Huguette De Wergifosse, Moissy-Cramayel (FR); Eric De Wergifosse, Blagnac (FR)

(73) Assignees: SAFRAN AIRCRAFT ENGINES, Paris (FR); SAFRAN ELECTRICAL & POWER, Blagnac (FR)

( * ) Notice: Subject to any disclaimer, the term of this patent is extended or adjusted under 35 U.S.C. 154(b) by 353 days.

(21) Appl. No.: 16/481,020

(22) PCT Filed: Jan. 22, 2018

(86) PCT No.: PCT/FR2018/050147
§ 371 (c)(1),
(2) Date: Jul. 25, 2019

(87) PCT Pub. No.: WO2018/138428
PCT Pub. Date: Aug. 2, 2018

(65) Prior Publication Data
US 2020/0003126 A1 Jan. 2, 2020

(30) Foreign Application Priority Data
Jan. 30, 2017 (FR) ...................................... 1750742

(51) Int. Cl.
*F02C 7/32* (2006.01)
*F16H 3/72* (2006.01)
(Continued)

(52) U.S. Cl.
CPC .................. *F02C 7/32* (2013.01); *F02C 7/22* (2013.01); *F02C 9/30* (2013.01); *F16H 3/727* (2013.01);
(Continued)

(58) Field of Classification Search
CPC ...... F02C 7/32; F02C 7/22; F02C 9/30; F16H 3/727; F16H 37/065
See application file for complete search history.

(56) References Cited

U.S. PATENT DOCUMENTS 4,470,261 A * 9/1984 Kronogard ................ F02C 6/14
                                                    180/301
2010/0018182 A1    1/2010 Bader et al.
2016/0186670 A1    6/2016 Oba

FOREIGN PATENT DOCUMENTS

| EP | 1359299 A1 | 11/2003 |
| EP | 2088302 A2 | 8/2009 |
| FR | 2934321 A1 | 1/2010 |

OTHER PUBLICATIONS

Written Opinion of the International Searching Authority dated May 2, 2018, issued in corresponding International Application No. PCT/FR2018/050147, filed Jan. 22, 2018, 7 pages.
(Continued)

*Primary Examiner* — Tinh Dang
(74) *Attorney, Agent, or Firm* — Christensen O'Connor Johnson Kindness PLLC

(57) ABSTRACT

A transmission device drives a fuel pump for a turbomachine using a drive shaft of said turbomachine. The transmission includes a planet reduction gearing with three elements: a central planet gear, an outer ring gear and a planet carrier. A first of the three elements connects to the drive shaft and a second of the three elements couples to a shaft of the pump. The three elements can be rotated about a shaft of the reduction gearing. First electrical means rotatably drive the
(Continued)

third element to modify a rotational speed ratio between the first and second elements. Second electrical means are coupled to the first or the second element. The first and second electrical means are arranged to transfer electrical power reversibly from one to the other.

10 Claims, 5 Drawing Sheets

(51) Int. Cl.
  *F16H 37/06*   (2006.01)
  *F02C 7/22*   (2006.01)
  *F02C 9/30*   (2006.01)
  *F04D 13/02*   (2006.01)

(52) U.S. Cl.
  CPC ......... *F16H 37/065* (2013.01); *F04D 13/022* (2013.01); *F05D 2260/40311* (2013.01); *F05D 2270/301* (2013.01)

(56) References Cited

OTHER PUBLICATIONS

International Preliminary Report on Patentability dated Jul. 30, 2019, issued in corresponding International Application No. PCT/FR2018/050147, filed Jan. 22, 2018, 1 page.
International Search Report dated May 2, 2018, issued in corresponding International Application No. PCT/FR2018/050147, filed Jan. 22, 2018, 5 pages.
Written Opinion of the International Searching Authority dated May 2, 2018, issued in corresponding International Application No. PCT/FR2018/050147, filed Jan. 22, 2018, 6 pages.

* cited by examiner

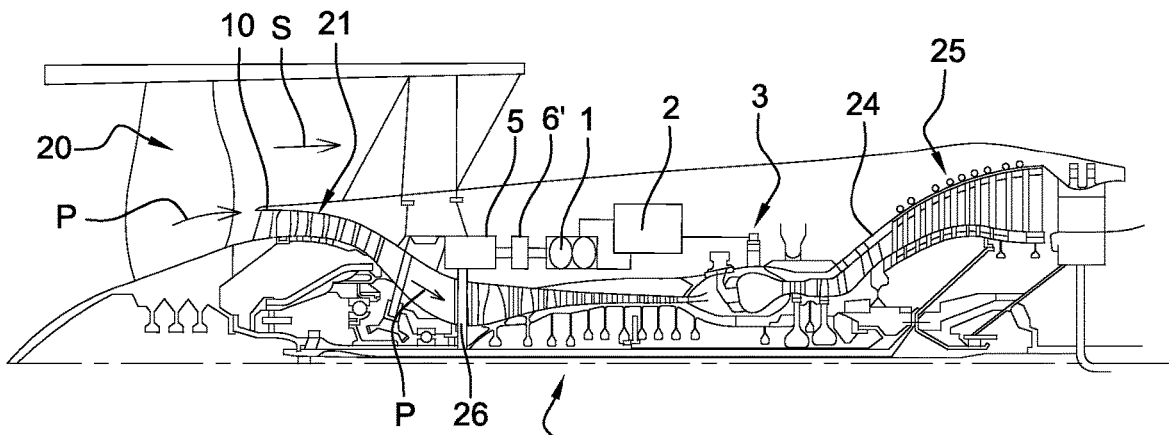
Fig. 3
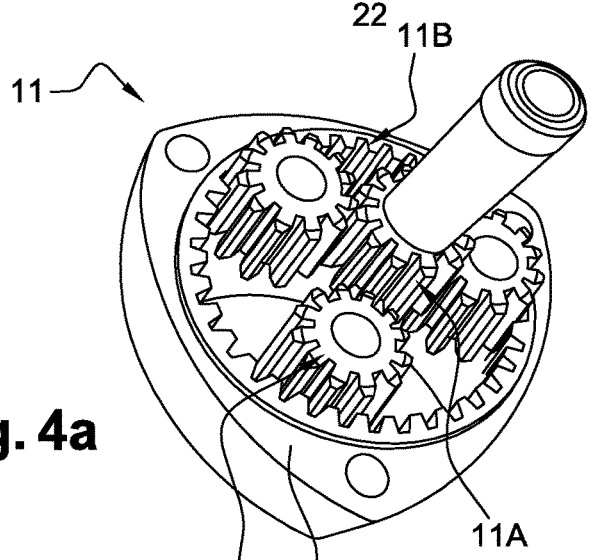
Fig. 4a
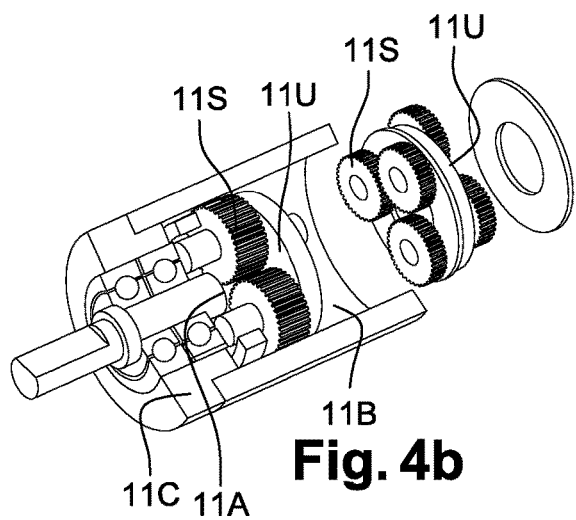
Fig. 4b
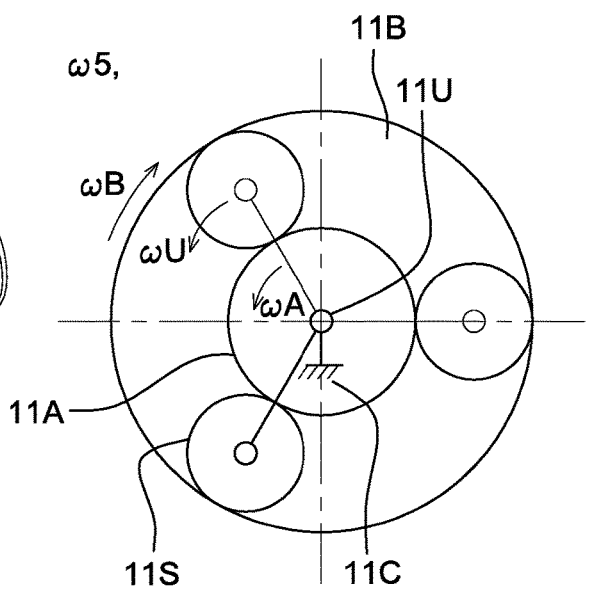
Fig. 4c
Fig. 4

DEVICE FOR DRIVING A FUEL PUMP FOR A TURBOMACHINE

TECHNICAL FIELD

Disclosed embodiments of the present device relate to the field of turbomachines. It concerns more particularly the fuel supply system and the adjusting of the fuel flow rate 5 in this circuit.

BACKGROUND

Known references to similar devices include patent applications published under the numbers FR-A1-2934 321, EP-A1-1 359 299, US-A1-2016/186670 and EP-A2-2 088 302.

Turbomachines installed on an aircraft are equipped with a fuel supply circuit, delivering fuel to the combustion chamber, which must be adjusted as required according to flight conditions. With reference to FIG. 1, the fuel circuit generally includes a main high-pressure pump 1 of volumetric type that sends fuel to a hydromechanical group 2 before the injection to combustion chamber 3. The assembly is designed to ensure, at the exit to the combustion chamber, a fuel flow rate adapted to the requirement. A control box 4 generally controls the hydromechanical group 2 so that it can adapt the flow rate sent from the pump 1 to the requirement of combustion chamber 3.

In general, the pump 1 is driven by an output shaft of the accessory box 5 of the turbomachine, itself driven by an axis of the primary body of the turbomachine, not shown in FIG. 1. A transmission device 6 is generally installed between the shaft of the accessory relay box 5 and the pump 1 to adapt the rotational speeds between these two sets of equipment. This device determines a ratio K between the speed of the pump 1 and the rotational speed w of the turbomachine drive shaft. This device generally also drives a supplying means 7 of the circuit from the fuel tanks 8.

The linear characteristic Cyl of the pump 1 between the fuel flow rate and its driving speed depends in particular on its displacement. The pump 1 must be dimensioned in such a way that this displacement allows to deliver the required flow rates for all operating speeds of the turbomachine, and therefore the speed of the output shaft of the accessory relay box 5, both at low speed and at high speed.

As shown in FIG. 2, representing the flow rate variations F as a function of the rotational speed ω of the drive shaft of the turbomachine, the fuel requirement F1 varies non-linearly as a function of the turbomachine speed. The rotational speed ω of the drive shaft of the turbomachine varies between a minimum value ωmin, for the ignition of the turbomachine, and a maximum value ωmax for the take-off. The regime corresponding to a cruise flight falls between these two extremes.

According to the application, the crucial point is located either at the low speed ignition or the high speed take-off. In FIG. 2, this crucial point is located at the ignition, the displacement of the pump must be chosen so that its linear characteristic is equal to the value of Cyl1, to ensure enough flow rate during all flight conditions. This value of Cyl1 can be significantly higher than the minimum value of Cylmin required under certain flight conditions, or even the value of Cyl2 required during take-off.

According to this dimensioning, the flow rate provided by the pump therefore follows the line L1 on the flow rate/rotational speed diagram in FIG. 2. During a large phase of driving speed, in particular in cruise flight, the pump thus delivers a flow rate higher than the fuel flow rate requirement, thus an excess F2 of fuel.

The hydromechanical group 2 must therefore return to the pump, through a recirculation loop 9, the excess F2 of fuel in relation to the requirement.

This fuel flow rate adjusting problem is further emphasized when the fuel circuit is used, as shown in FIG. 1, to actuate variable geometries 10 of the turbomachine. The actuation of variable geometries 10 creates variations in fuel requirement in the circuit that must be considered in the dimensioning of the pump 1, in the operation of the hydromechanical group 2 and in the characteristics of the recirculation loop 9.

This architecture of the fuel supply system has several disadvantages. The excess flow rate injected by the pump 1 induces an excess of power collection on the accessory relay box 5 compared to the requirement, which is detrimental to the performance of the turbomachine. The excess mechanical power is transformed into high thermal power dissipated in the recirculation loop 9, which must be evacuated. This has a negative influence on the size and mass of the fuel circuit, in particular for unrepresented heat exchangers placed to dissipate heat in this circuit.

The purpose of the invention is to remedy at least some of these disadvantages.

SUMMARY

For this purpose, the invention concerns a transmission device for driving a fuel pump for a turbomachine from a drive shaft of said turbomachine, comprising an epicyclic gear reducer comprising three elements, a central sun gear, an outer ring gear and a planet carrier, the planets of which engage with the sun gear and the ring gear, a first of the three elements being intended to be connected to the drive shaft and a second of the three elements being intended to be coupled to a shaft of the pump, characterized in that said three elements can be rotated about a shaft of the reducer, in that the device further comprises first electrical means arranged so as to rotatably drive the third of said elements of the reducer, in such a way as to modify a rotational speed ratio between the first and second of said elements, and second electrical means coupled to the first or the second of said elements of the reducer, the first and second electrical means being arranged so as to transfer electrical power reversibly from one to the other.

The transmission device thus arranged allows to modify the speed of the pump for a given engine regime of the turbomachine. Thus, the speed of the pump can be adjusted to deliver the correct fuel flow rate to the various operating points of the turbomachine. By setting a maximum permissible speed of the pump, the displacement of the pump is now only dependent on the operating point at take-off and not on the operating point at ignition point.

From an energy point of view, the power collected from the drive shaft will always be strictly equal to the minimum requirement thanks to the power transfer. This results in a gain in the power collected to operate the fuel circuit.

In addition, the reversible power transfer between the two motors allows the device to operate without the requirement for external power when controlling the pump, the second motor collecting the power required to operate the first motor, when the latter is running as a motor. Power transfer allows both motors to operate in both modes: in motor mode and in generator mode. According to the point of operation, the first motor can either be in motor mode or generator mode and the second motor in generator mode or motor mode.

In addition, the reactivity of the transmission device to adapt the speed of the pump allows to simplify the fuel system. This also allows to significantly reduce the size of the fuel recirculation loop or even eliminate it.

According to a first embodiment, the first of said elements of the reducer is the ring gear, the second of said elements is the sun gear and the third of said elements is the planet carrier, and the second electrical means are coupled to the first of said three elements.

According to another embodiment, the second electrical means are coupled to the second of the three elements of the reducer.

A study by the inventors shows that coupling the second electrical means and the pump to the same element of the reducer, rather than coupling the second electrical means to the drive shaft, allows to minimize as much as possible the power transferred between the two motors.

In a first variant of this embodiment, the first of said three elements is the ring gear, the second of said three elements is the sun gear, and the third of said three elements is the planet carrier.

In a preferred variant of this embodiment, the first of said three elements is the ring gear, the second of said three elements is the planet carrier, and the third of said three elements is the sun gear.

This preferred variant allows to operate at a speed of the pump lower than the output shaft speed of the accessory relay box. This variant corresponds to the minimum value of the power transfer.

In an improvement of this variant, the device comprises at least one wheel connected to the drive shaft which engages from the outside with the ring gear of the reducer.

Preferably, at least one complementary wheel is connected to one of said first and second electrical means and engages with the planet carrier.

This improvement allows, in particular, to place the various components of the device on either side of the transmission of the accessory relay box.

The invention also concerns a fuel supply system for a turbomachine comprising a pump arranged to provide a fuel flow rate which is an increasing function of the rotational speed of a shaft of said pump and a transmission device as described above, wherein the second of said elements is coupled to said shaft of the pump.

The invention also concerns a turbomachine with such a supply system.

An accessory relay box is preferably placed between the drive shaft and the first of said elements of the reducer.

The invention also concerns a method for adjusting a fuel pump for a turbomachine in an aircraft, a shaft of the pump being driven by a drive shaft of the turbomachine by means using a transmission device as described above, characterized in that the rotational speed of the shaft of the pump is modified by controlling the rotational speed of the third element of the reducer by the first electrical means, so that the fuel flow rate delivered by the pump is adapted to the flight conditions of the aircraft, and that the second electrical means are controlled in such a way as to provide electrical energy to the first electrical means when they are motors and/or to absorb the electrical energy supplied by the first electrical means when they are generators.

BRIEF DESCRIPTION OF THE FIGURES

This invention shall be better understood, and other details, characteristics and advantages of this invention shall appear more clearly when reading the description of a following non-limitative example, with reference to the annexed drawings on which:

FIG. 3 shows a very schematic half section of a turbomachine that can use the invention;

FIG. 4 shows exploded views and a diagram for an epicyclic gear reducer that can be used by the invention;

Figure 1:
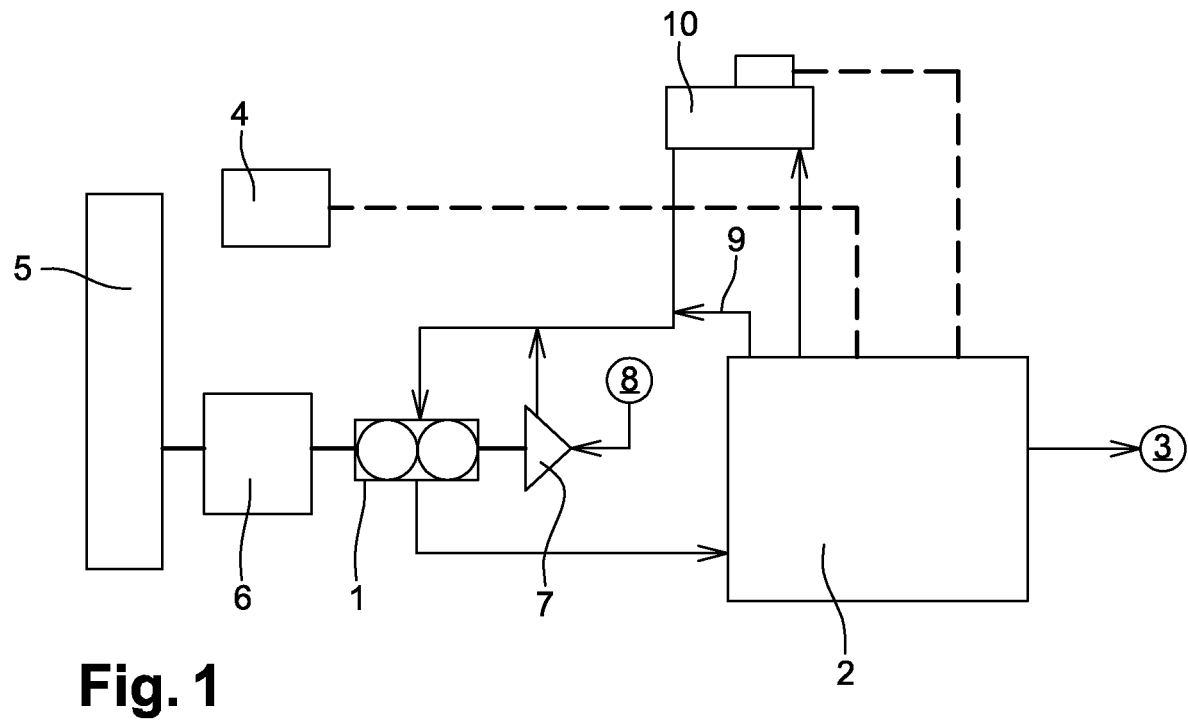
FIG. 1 shows a very schematic fuel circuit according to the background of the invention.

The elements having the same functions in the different embodiments have the same references in the figures.

DETAILED DESCRIPTION

In a turbomachine, for example a dual flow turbomachine shown in FIG. 3, the air flow at an outlet of the fan 20 is divided into a primary flow P entering the engine and a secondary flow S surrounding the engine. The primary flow then passes through low-pressure compressors 21 and high-pressure compressors 22, the combustion chamber 3 supplied by the fuel system mentioned above, and then high-pressure turbines 24 and low-pressure turbines 25. Generally, all high-pressure compressors 22 and high-pressure turbines 24 rotate as a unit on a common shaft 26 and form the engine part of the turbomachine with the combustion chamber.

Generally, the drive shaft 26 drives the accessory relay box 5 which can include several epicyclic gears connected to the output shafts to drive various equipment. Here one of the output shafts of the gear box drives, by a transmission device 6', the volumetric pump 1 which supplies the hydro-mechanical group 2 which injects the fuel into the combustion chamber 3. Generally, also, the accessory relay box connects the drive shaft 26 to a starter/generator, not shown in this figure, which can be used to drive the turbomachine during the starting phases or generate an electric current when the turbomachine is switched on.

The turbomachine can also have variable geometries 10, mentioned above, which can be activated under certain operating conditions. These variable geometries 10 are, for example, variable pitch vanes at the inlet of a low-pressure compressor.

Figure 9:
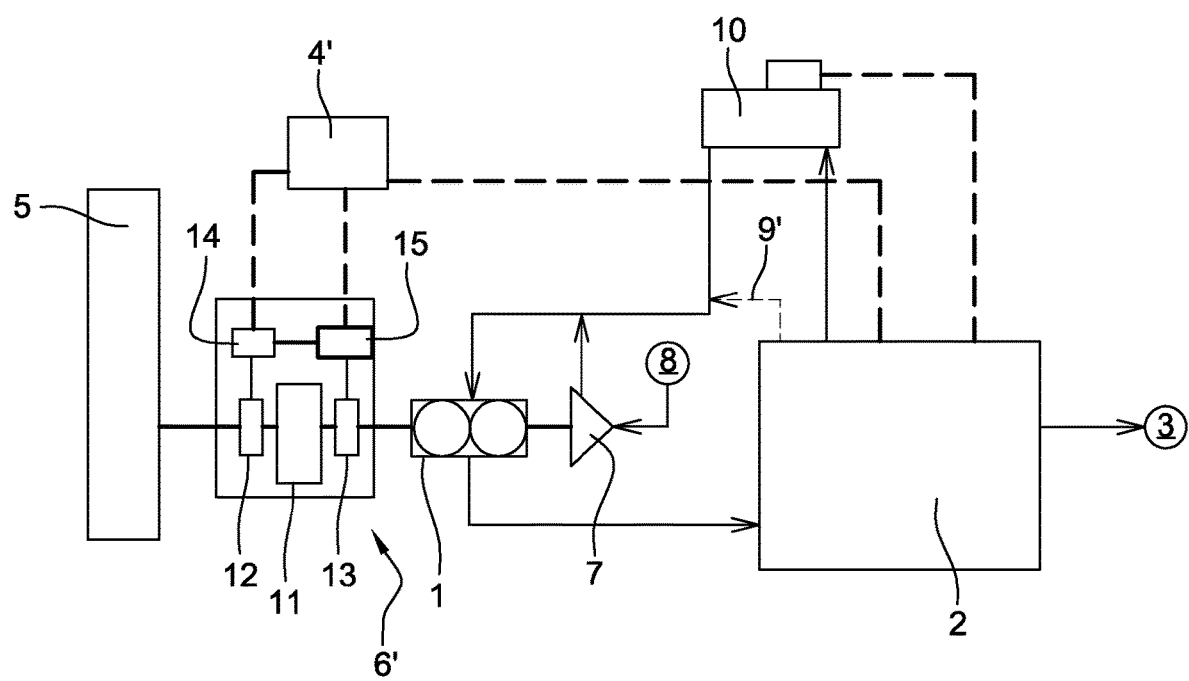
FIG. 9 shows very schematically a fuel circuit using a transmission device according to the invention.

Here, in reference to FIG. 9, the fuel supply system has a transmission device 6' between the accessory relay box 5 and the pump 1 different from the system in FIG. 1. The pump 1 can be of the same nature as the conventional solution. It is a rotating volumetric pump, the flow rate of which is an increasing function of the rotational speed $\omega 1$, capable of providing the necessary flow rate for injection into the combustion chamber 3 and pressurizing the fuel circuit. Preferably, it has a linear characteristic Cyl connecting the output flow rate to the rotational speed ω1.

The transmission device 6' includes an epicyclic gear reducer, the properties of which are used to adapt the rotational speed of the pump 1 to the requirement of fuel flow rate according to the different operational regimes of the turbomachine.

Referring to FIG. 4, the epicyclic gear reducer 11 includes:

a central sun gear 11A, arranged to be able to rotate about the axis of the epicyclic gear at a speed ωA;

planets 11S engaging with the central sun gear 11A and carried by a planet carrier 11U, the planet carrier 11U being arranged to be able to rotate around the axis of the epicyclic gear at a speed ωU;

an outer ring gear 11B with which the planets 11S also engage, the ring gear 11B being arranged to be able to rotate around the epicyclic gear axis at a speed of ωB.

A characteristic of the epicyclic gear reducer 11 is therefore that its three elements, the central sun gear 11A, the planet carrier 11U and the ring gear 11B, can rotate. Here, for example, the ring gear 11B is free to rotate inside a fixed casing 11C protecting the reducer 11.

The operation of the reducer 11 is governed by Willis' equation, which shows that it is a mechanism with two degrees of freedom and that the knowledge of the rotational speeds of two elements among the central sun gear 11A, the planet carrier 11U and the ring gear 11B, allows the calculation of the rotational speed of the third.

Rotation of the central sun gear 11A: ωA
Rotation of the planet carrier 11U: ωU
Rotation of the ring gear 11B: ωB WILLIS equation: $(\omega A - \omega U)/(\omega B - \omega U) = k$ or
$\omega A - k*\omega B + (k-1)*\omega U = 0$ In Willis' equation, the factor k, also called the epicyclic gear reason, is a constant determined by the geometry of the gears. For the reducer 11 in FIG. 4, $k = -ZB/ZA$, where ZA is the number of teeth of the central sun gear A and ZB the number of teeth of the ring gear B. The k-factor is therefore negative with a modulus of less than 1.

It is therefore understood that, if the output shaft of the accessory relay box 5 is coupled to one of the three elements and the shaft of the pump 1 is coupled to a second element, the rotational speed of the pump 1 can be varied for a given speed of the shaft of the box 5 by varying the rotational speed of the third element.

According to the invention, a first electric motor 12 is coupled to the third element to control its rotational speed.

Six combinations are possible to position these three equipment, the accessory relay box 5, the pump 1 and the first motor 12, in relation to the three elements of the epicyclic gear reducer 11.

Figure 5:
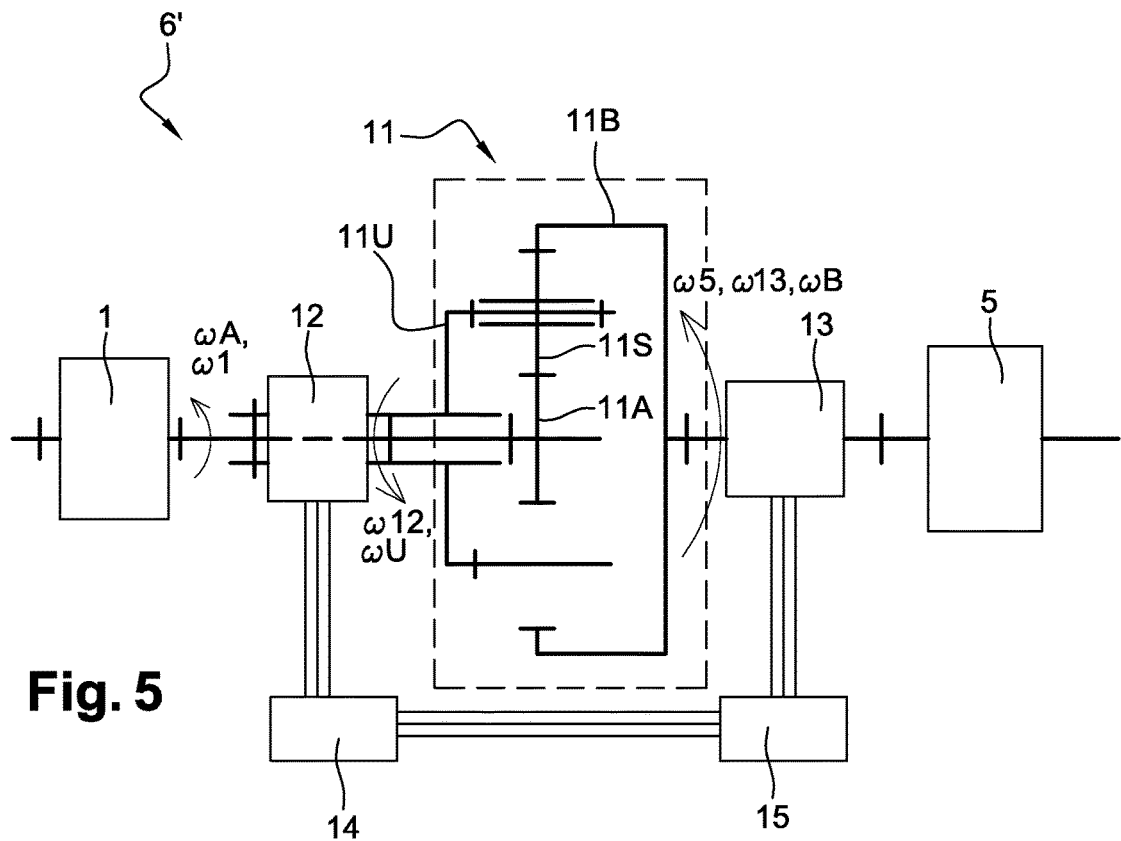
FIG. 5 shows the diagram of a first embodiment of a transmission device according to the invention between the turbomachine and the pump using a reducer from FIG. 4.

FIG. 5 illustrates a configuration where the accessory relay box 5 is connected to the ring gear 11B, the pump 1 to the central sun gear 11A and the electric motor 12 to the planet carrier 11U.

According to the invention, a second motor 13 is also coupled to one of the elements of the reducer 11 which is not coupled to the first motor 12. In FIG. 5, it is the ring gear 11B, also coupled to the box 5.

The first motor 12 and the second motor 13 each have a stator and a rotor. The said motors 12, 13 are controllable in terms of torque applied to their rotor and rotational speed ω12, ω13 of their rotor. These are, for example, AC asynchronous motors. The torque and speed of each motor 12, 13 are then controlled by the electrical power and frequency of the current sent by a converter 14, 15 dedicated to each.

In addition, the second motor 13 is electrically connected to the first motor 12 via said reversible voltage converters 14, 15, in order to pass power from one to the other.

The position of the second motor 13 doubles the number of possible combinations for the device 6'. This results in twelve combinations listed in the table below.

This table also indicates the function giving the speed ω1 of the pump 1 from the speed ω5 of the shaft of the box 5 and the speed ω12 of the first motor 12. The rotational speed ω13 of the second motor 13 is determined by the rotational speed of the equipment with which it is coupled in series on the reducer 11, either the shaft of the pump 1 or the output shaft of the box 5. In this table, the option 1 corresponds to cases where the second motor 13 is coupled in series with the pump 1 on the same element of the reducer 11, and the option 2 corresponds to cases where the second motor 13 is coupled in series with the output shaft of the accessory relay box 5 on the same element of the reducer 11.

TABLE 1

| Connection box/pump/first motor | | | Connection second motor | |
| --- | --- | --- | --- | --- |
| Motor 12 | Pump 1 | Pump speed | Option 1 | Option 2 |
| Box 5 connected to the planet carrier 11U | | | | |
| 1A ring gear 11B | sun gear 11A | $\omega1 = (1 - k) * \omega5 + k * \omega12$ | sun gear A | planet carrier 11U |
| 1B sun gear 11A | ring gear 11B | $\omega1 = -\omega5 * (1 - k)/k + \omega12/k$ | ring gear B | planet carrier 11U |
| Box 5 connected to the ring gear 11B | | | | |
| 2A planet carrier 11U | sun gear 11A | $\omega1 = k * \omega5 + (1 - k) * \omega12$ | sun gear A | ring gear B |
| 2B sun gear 11A | planet carrier 11U | $\omega1 = -\omega5 * k/(1 - k) + \omega12/(1 - k)$ | planet carrier 11U | ring gear B |
| Box 5 connected to the sun gear 11A | | | | |
| 3A ring gear 11B | planet carrier 11U | $\omega1 = \omega5/(1 - k) - \omega12 * k/(1 - k)$ | planet carrier 11U | sun gear A |
| 3B planet carrier 11U | ring gear 11B | $\omega1 = \omega5/k - \omega12 * (1 - k)/k$ | ring gear B | sun gear A |

In addition, with reference to FIG. 9, the fuel supply system also differs from the one in FIG. 1 in that the control box 4' is connected to the converter 14, to control the speed ω12 and the torque of the first motor 12 in order to adapt the speed ω1 of the pump 1, and to the converter 15, to control the torque of the second motor 13 to manage the power transfer between the two motors.

The study of the reducer 11 shows that the torque CA acting on the sun gear 11A, the torque CB acting on the ring gear 11B and the torque CU acting on the planet carrier 11U are connected by two relationships:

$$CA+CB+CU=0 \text{ (epicyclic gear equilibrium)}$$

$$\omega A*CA+\omega B*CB+\omega U*CU=0 \text{ (power equilibrium)}$$

Considering the relationships between the rotational speed of these elements, it is possible to calculate the torques acting on two elements of the reducer 11 knowing the third one.

The second motor 13, being connected in series with the pump 1 or the box 5, has its rotational speed determined as being equal to that of this equipment.

However, it is understood that it provides an additional degree of freedom to the system depending on the torque it exerts, and which is added to that of the pump 1 or the box 5 on the corresponding element of the reducer 11.

This additional degree of freedom can be used to ensure power transfer with the first motor: either to provide power when the first motor 12 is used to accelerate the pump 1 with respect to the drive of the box 5, or to absorb power when the first motor 12 is used to brake the pump 1.

The device depends on several parameters including: the reason k of the epicyclic gear of the reducer 11; the ratio of the rotational speed ω5 at the output of the box 5 to the rotational speed of the drive shaft 26 of the turbomachine; the linear characteristic Cyl and the maximum value of the rotational speed ω1 of the pump 1.

Figure 2:
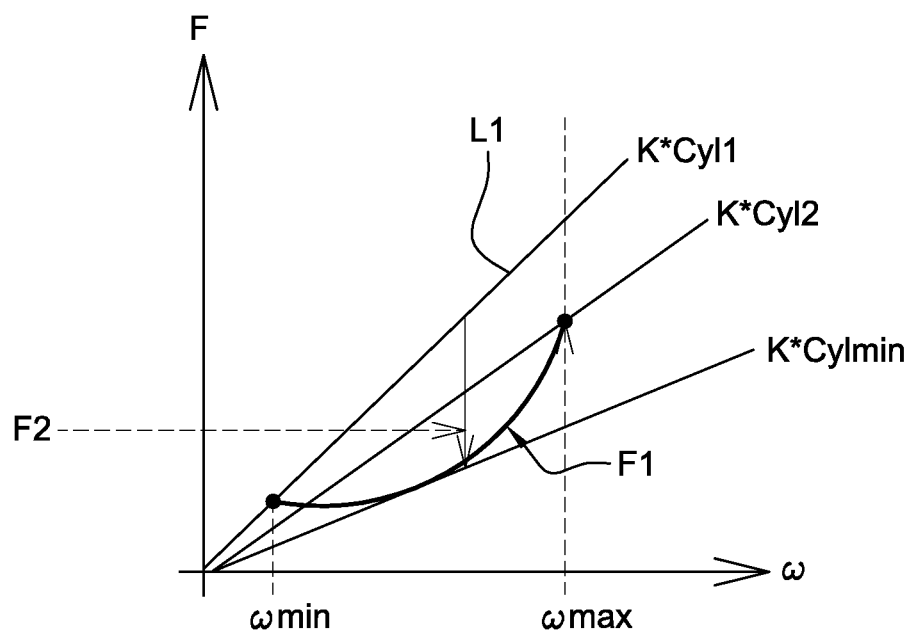
FIG. 2 shows a speed and flow rate diagram showing the difference between the flow rate provided by the fuel pump and the requirement for a circuit as shown in FIG. 1.

A choice among the twelve configurations must be made by optimizing these parameters to achieve in particular the following objectives:
- allow the pump 1 to rotate at a speed ω1 that adjusts to provide a flow rate Cyl*ω1 that corresponds to the requirement F1, as shown for example in FIG. 2, when the rotational speed of the drive shaft 26 of the turbomachine varies between its minimum ωmin and maximum ωmax values;
- minimize the power transfers between the first motor 12 and the second motor 13 to adjust the speed ω1 of pump 1 to the operating range of the turbomachine.

Not all the combinations in Table 1 necessarily achieve these objectives.

In addition, technological constraints on the equipment used generally imply that:
- the speed ω1 of the pump 1 must be lower than the one ω5 of the output shaft of the accessory relay box 5; and
- the speed ω12 of the electric motor 12 must be limited to a maximum value.

A specific study of the optimization of each combination is therefore necessary to justify a choice of implementation on a turbomachine. The inventors made this systematic study on an example of a turbomachine and found that the combinations described below have various advantages to consider for integration into a turbomachine.

Referring to FIG. 5, the configuration "2A-Option 2" corresponds to the following connections:
- the box 5 connected to the ring gear 11B;
- the pump 1 connected to sun gear 11A;
- the first motor 12 connected to the planet carrier 11U;
- the second motor 13 connected to the ring gear 11B, in series with the box 5.

This configuration allows to meet three constraints:
- speed ω1 of the pump 1 lower than the one ω5 of the output shaft of the accessory relay box 5;
- speed ω12 of the electric motor 12 higher than the one ω1 of the pump 1;
- possibility of power transfer between the first motor 12 and the second motor 13 even at a zero speed operating point of the pump.

However, this configuration does not minimize the power transmitted between the first motor 12 and the second motor 13.

Figure 6:
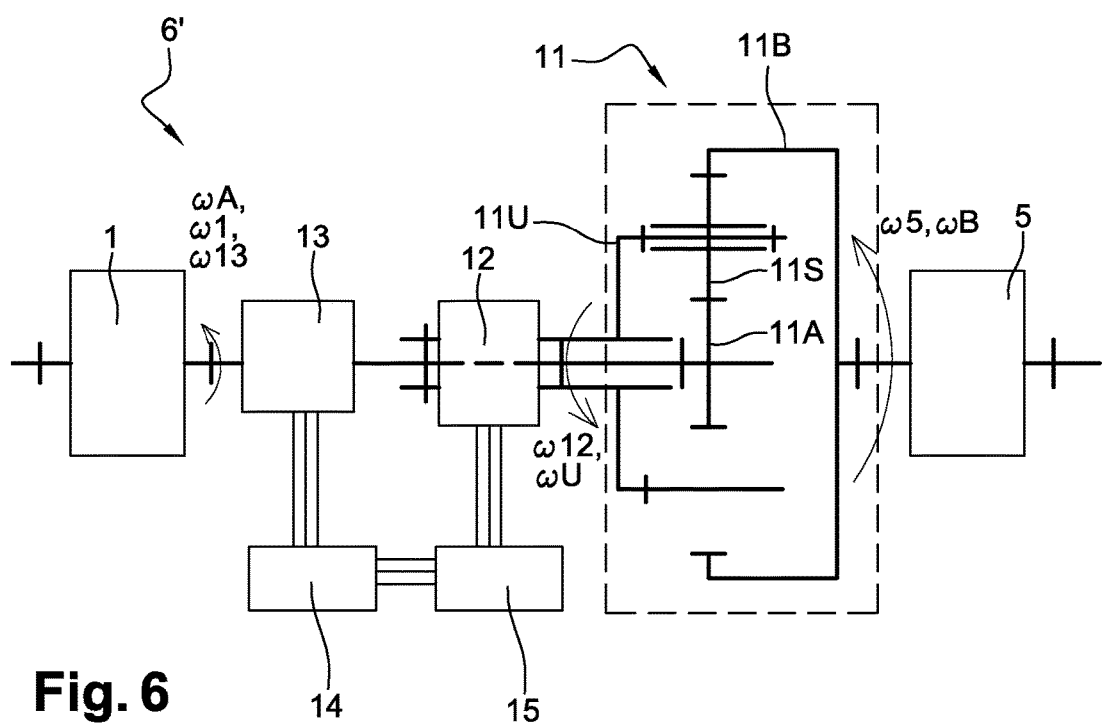
FIG. 6 shows the diagram of a second embodiment of a transmission device according to the invention between the turbomachine and the pump using a reducer from FIG. 4.

Referring to FIG. 6, the configuration "2A-Option 1" corresponds to the following connections:
- the box 5 connected to the ring gear 11B;
- the pump 1 connected to sun gear 11A;
- the first motor 12 connected to the planet carrier 11U;
- the second motor 13 connected to the sun gear 11A, in series with the pump 1.

This configuration allows to meet three constraints:
- speed ω1 of the pump 1 lower than that the one ω5 of the output shaft of the accessory relay box 5;
- speed ω12 of the electric motor 12 higher than the one ω1 of the pump 1; and
- optimization of the power transmitted between the first motor 12 and the second motor 13.

It is important to consider a maximum transmitted power between the first motor 12 and the second motor 13, in order to limit their size.

For example, limiting this power transfer to 2 KW appears to be advantageous for this criterion.

In general, it appears from the inventors' study that the use of option 1, coupling the second motor 13 in series with the pump 1, allows a maximum reduction in the power transmitted between the two motors 12, 13.

However, the "2A-Option 1" configuration in FIG. 6 does not allow power transfer between the first motor 12 and the second motor 13 for a zero speed operating point of the pump and transmits a lower power to the pump than the "2A-Option 2" configuration.

Based on a particular turbomachine model, a configuration is likely to allow an optimization of the parameters to achieve a criterion for optimizing the maximum transmitted power between the two motors, by checking the other criteria.

Figure 7:
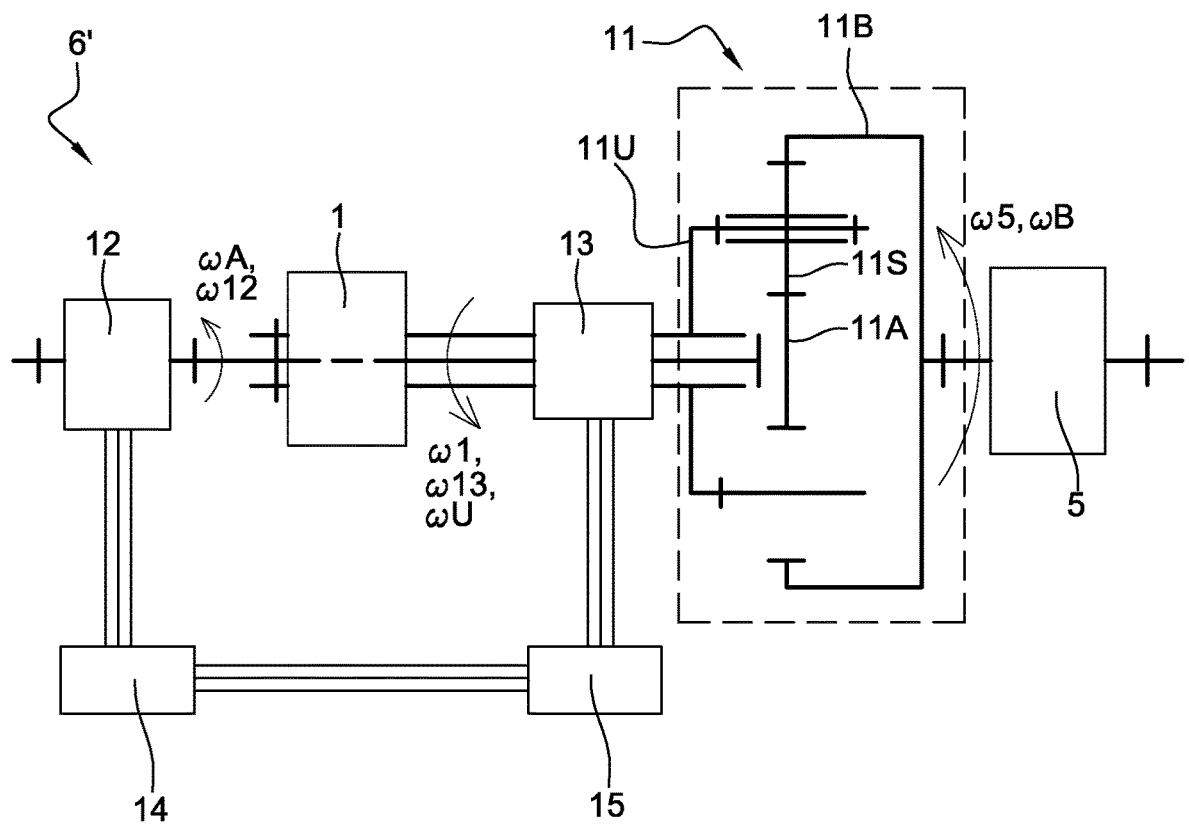
FIG. 7 shows the diagram of a third embodiment of a transmission device according to the invention between the turbomachine and the pump using a reducer from FIG. 4.

This is the "26-Option 1" configuration, shown in FIG. 7 and corresponding to the following connections:
- the box 5 connected to the ring gear 11B;
- the pump 1 connected to the planet carrier 11U;
- the first motor 12 connected to the sun gear 11A;
- the second motor 13 connected to the planet carrier 11U, in series with the pump 1.

Figure 8:
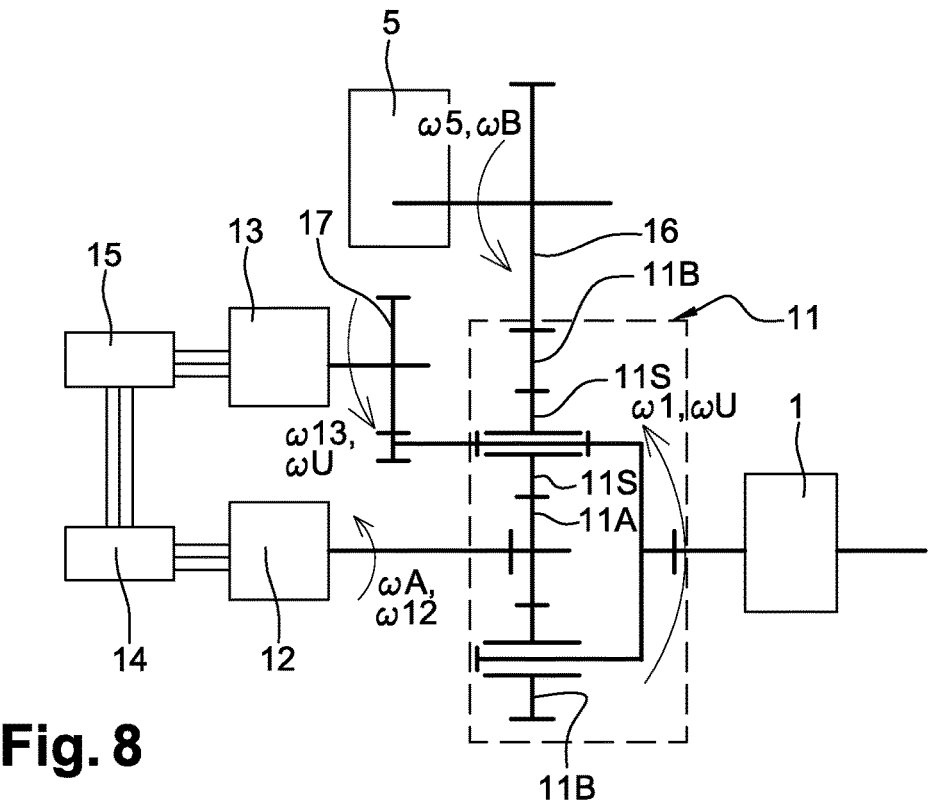
FIG. 8 shows the diagram of an improvement of the embodiment described in FIG. 7.

Referring to FIG. 8, an improvement of the previous variant allows the components of the transmission device to be arranged on either side of the box 5 by means of additional epicyclic gears. As shown in FIG. 8, the axis exiting the gear box 5 drives the ring gear 11B by the gearing of a wheel 16 which allows the axes to be shifted. Similarly, the motor 13 is connected to the planet carrier 11U by the gear of the wheel 17 on the planet carrier.

The box 5 can include some of these gears, which allows, as shown in FIG. 8, to distribute the equipment on either side of the accessory relay box 5 and, in particular, to become more compact. The place of the motors 12 and 13 can be exchanged, which also allows the configuration 2B option 2 to be implemented.

Optionally, the accessory relay box 5 can include the gears of the reducer 11 and directly realize the reduction ratio K between the speed ω1 of the pump 1 and the speed ω1 of the drive shaft 26 of the turbomachine.

In addition, as a reference to FIG. 9, regardless of the configuration chosen for the transmission device 6', the fuel circuit is different from the one of FIG. 1 in that the control box 4' is connected to the first motor 12 and the second motor 13, to control their speeds ω12, ω13 in order to adapt the speed ω1 of the pump 1 and to optimize the power transfer. The control mode of the two motors 12, 13 allows them to operate in all four quadrants, in terms of torque and speed.

If, for example, the transmission device corresponds to the configuration "2B-Option 1", the speed ω1 of the pump 1 is given by the formula in table 1:

$$\omega1 = -\omega5*k/(1-k) + \omega12/(1-k)$$

Depending on whether the first motor 12 drives the sun gear 11A with a positive or negative value ω12, the pump 1 can be driven at a speed lower or higher than the speed—ω5*k/(1−k) it would have for a gear 11 with a fixed sun gear.

When operating the turbomachine on the aircraft, the control box 4' adjusts the speed ω1 of the pump 1 to the fuel requirement of the ignition chamber 3 by varying the speed ω12 of the first motor 12.

Depending on whether the rotational speed of the motor 12 is positive or negative, the motor 12 provides the power to increase the speed of the pump 1 or recovers power to decrease this speed. The power collected from the output shaft of the accessory relay box 5 is, in some flight phases, less than the hydraulic power requirement of the pump 1 and, in some flight phases, more than the requirement for flight phases.

The control box 4' also controls the second motor 13, which rotates at the speed ω1 of the pump 1, in order to adapt its torque to absorb or inject the power that the first motor 12 generates or uses.

When designing the pump 1, it is therefore no longer necessary to dimension it with a displacement corresponding to the maximum value of K but, for example, for an intermediate value. If we refer to the case in FIG. 2, for example, by setting a maximum permissible speed for the pump 1, we can dimension the pump 1 for the take-off point and no longer for the more restrictive ignition point. This reduces the displacement of the pump with respect to the prior art.

In addition, the system always provides the pump 1 with the minimum power to meet the fuel flow rate requirement. This has two positive consequences.

First, the power collected directly from the output shaft of the accessory relay box 5 is always strictly equal to the requirement, thanks to the power transfer between the two motors 12, 13.

The absence of loss comes from this transfer of electrical power, the motor 12 either recovering energy through the transmission device and returning it to the motor 13 or recovering energy from the motor 13 and returning it in motor mode to the transmission device.

During operation, the epicyclic gear behaves in three different ways.

First, if the speed ω5 of the shaft of the box 5 is such that the speed ω1 of the pump 1 corresponds to the requirement, the controlling speed of the motor 12 is zero and the speed of the pump 1 is connected to the speed of the shaft of the box 5 by the reduction ratio of the epicyclic gear at a speed of the motor 12 of zero.

Secondly, if the speed ω5 of the shaft of the box 5 is such that the speed ω1 of the pump 1 is higher than the requirement, the motor 12 will be driven to operate in a certain direction of rotation in generator mode, a speed ω12 adapted to reduce the speed of the pump 1. The recovered energy will be returned to the motor 13 operating in motor mode.

Thirdly, if the speed ω5 of the shaft of the box 5 is such that the speed ω1 of the pump 1 is lower than necessary, the motor 12 will be controlled to operate in the other direction of rotation in motor mode, at a speed ω12 to increase the speed of pump 1. The energy returned to the motor 12 comes from the energy recovered from the motor 13 operating in the generator mode.

The power collected from the turbomachine is therefore lower than the one collected in an architecture such as that described in FIG. 1.

In addition, the size and mass of the motors capable of absorbing or restoring the power transferred between them are smaller than that of a battery that would act as a reservoir of electrical energy. This configuration with two motors therefore allows to achieve the objectives by minimizing the size and mass of the transmission device 6' between the accessory relay box 5 and the pump 1.

Secondly, as the flow rate delivered by the pump 1 is adapted to the requirement, there is no longer a requirement for a recirculation loop exiting from the hydromechanical adjusting group 2 for stationary operation phases. There is therefore no longer any requirements to evacuate the excess thermal energy created by the excess flow rate. This simplifies the fuel circuit and minimizes the size of the heat exchangers on the fuel circuit.

With reference to FIG. 9, the fuel circuit can retain a recirculation loop 9', but the latter is only sized to allow the circuit to adapt during transients, taking into account the reaction times of equipment such as the hydromechanical adjusting group 2, the pump 1 and the unrepresented sensors used for adjusting.

However, the reactivity of the transmission device 6' to adapt the rotational speed of the pump 1 allows to simplify the hydromechanical adjusting group 2: removal of the hydraulically controlled adjusting valve by the differential pressure of the measuring unit, the servo valve for controlling the measuring unit and potentially the overspeed electro-valve (elements not described in the figures).

The invention claimed is:

1. A transmission device for driving a fuel pump for a turbomachine from a drive shaft of said turbomachine, the device comprising an epicyclic gear reducer comprising the following three elements:
   a central sun gear;
   an outer ring gear; and
   a planet carrier, the planets of which engage with the sun gear and the ring gear,
   a first of the three elements being configured to be connected to the drive shaft and a second of the three elements being configured to be coupled to a shaft of the pump, wherein said three elements are configured to be rotated about a shaft of the reducer, the device further comprising first electrical means arranged to rotatably drive the third of said elements of the reducer to modify a rotational speed ratio between the first and the second of said elements, and second electrical means coupled to one of the first and the second of said elements of the reducer, the first and second electrical means being arranged to transfer electrical power reversibly from one to the other.

2. The transmission device according to claim 1, wherein the first of said elements of the reducer is the ring gear, the second of said elements is the sun gear and the third of said elements is the planet carrier, and wherein the second electrical means are coupled to the first of said three elements.

3. The transmission device according to claim 1, wherein the second electrical means are coupled to the second of the three elements of the reducer.

4. The transmission device according to claim 3, wherein the first of said three elements is the ring gear, the second of said three elements is the sun gear, and the third of said three elements is the planet carrier.

5. The transmission device according to claim 3, wherein the first of said three elements is the ring gear, the second of said three elements is the planet carrier, and the third of said three elements is the sun gear.

6. The transmission device according to claim 5, further comprising at least one wheel connected to the drive shaft which engages from the outside with the ring gear of the reducer.

7. The transmission device according to claim 6, further comprising at least one complementary wheel connected to one of said first and second electrical means, which engages on the planet carrier.

8. A fuel supply system for a turbomachine comprising a pump arranged to provide a fuel flow rate which is an increasing function of the rotational speed ($\omega 1$) of a shaft of said pump and a transmission device according to claim 1, wherein the second of said elements is coupled to said shaft of the pump.

9. A turbomachine comprising a supply system according to claim 8.

10. A method for adjusting a fuel pump for a turbomachine in an aircraft, a shaft of the pump being driven by a drive shaft of the turbomachine by means using a device according to claim 1, the method comprising modifying a rotational speed of the shaft of the pump by controlling a rotational speed of the third element of the reducer by the first electrical means, so that the fuel flow rate delivered by the pump is adapted to the flight conditions of the aircraft, and in that the second electrical means are controlled to provide electrical energy to the first electrical means when the first electrical means comprise are motor or to absorb the electrical energy supplied by the first electrical means when the first electrical means comprise generator.

\* \* \* \* \*

UNITED STATES PATENT AND TRADEMARK OFFICE
CERTIFICATE OF CORRECTION

PATENT NO. : 11,220,959 B2
APPLICATION NO. : 16/481020
DATED : January 11, 2022
INVENTOR(S) : H. De Wergifosse et al.

It is certified that error appears in the above-identified patent and that said Letters Patent is hereby corrected as shown below:

In the Claims

| Column | Line | |
|---|---|---|
| 12 | 22 | change "are motor" to -- a motor --. |
| 12 | 24 | change "comprise" to -- comprise a --. |

Signed and Sealed this
Eighteenth Day of April, 2023

Katherine Kelly Vidal
*Director of the United States Patent and Trademark Office*